Patented May 27, 1952

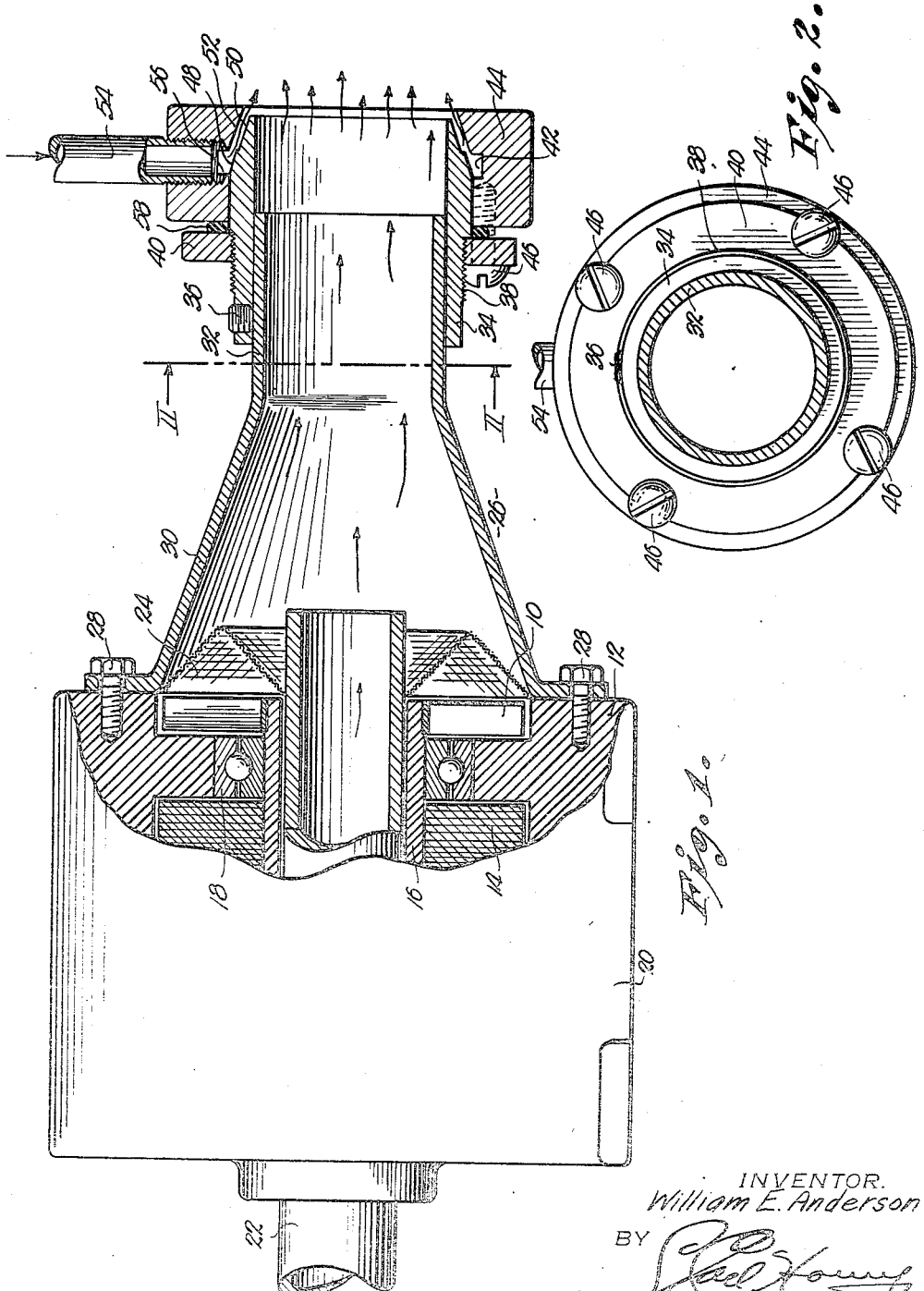

2,597,916

UNITED STATES PATENT OFFICE 2,597,916

MATERIAL FEEDER AND HYDRATOR

William E. Anderson, Kansas City, Mo., assignor of one-half to William Earl Anderson, Blue Springs, Mo.

Application July 29, 1946, Serial No. 686,939

5 Claims. (Cl. 259—4)

This invention relates to material feeders and hydrators and more particularly to structure adapted to move comminuted material from a point of storage and direct the same with force against an upright surface, and having parts for hydrating the material as it moves through its path of travel and before it reaches said surfaces.

The primary object of this invention is to provide a material feeder and hydrator having means for creating suction in a conduit in communication with a source of comminuted material for forcing the material through the conduit and shoot the same with force from an open end of said conduit to a point of application therebeyond.

An important object of this invention is to provide in a material feeder and hydrator having the aforesaid material moving means as a part thereof, a specially formed head encircling the material at a point along its path of travel for directing liquid toward the material before it reaches the end of its path of travel and after the said material moves from the open end of the conduit through which it is forced.

Another important object of this invention is the provision of a material feeder and hydrator having a head in communication with a source of fluid under pressure, which head is provided with a continuous, annular outlet port the size whereof may be varied to control the amount of liquid that is to be mixed with said material.

A further object of this invention is to provide a material feeder and hydrator having a head for directing fluid under pressure toward the material as it is shot along a longitudinal path of travel, provided with a frusto-conical, annular outlet port for directing the fluid outwardly from the head and inwardly toward the material whereby the material is thoroughly hydrated before it reaches a point of use.

A still further object of this invention is to provide a material feeder and hydrator having a centrifugal blower for forcing material along a conduit through an open end thereof and means for directing a blast of air radially inwardly toward the material as it flows from the conduit, and structure surrounding the material and extending from the conduit so designed as to reduce the cross-sectional area of the material before it passes through the aforementioned stream of fluid.

Other objects, equally important, will be made clear or become apparent throughout the following specification, referring to the accompanying drawing, wherein:

Figure 1 is a side elevational view of the material feeder and hydrator made in accordance with my present invention, parts being broken away to reveal details of construction; and Fig. 2 is a cross sectional view taken on line II—II of Fig. 1.

The prime mover for rotating a blower, including blades 10, consists of a conventional electrical motor comprising a stationary member or stator 12 and a rotor 14, in communication with a source of electrical supply, not shown. The rotor 14 is fixed to a sleeve 16 which rotates in a bearing assembly 18, and the blower blades 10 are mounted directly on this sleeve 16 as is clear in Fig. 1.

All of the aforementioned parts are housed within a case 20 which also mounts a conduit 22 passing through and in telescoping relation with the sleeve 16 to terminate in an open end beyond the blades 10. This conduit 22 is in communication with a hopper adapted to store comminuted material, and particularly a mixture of sand and cement, the ingredients commonly used in constructing concrete building blocks. This hopper assembly is not illustrated and forms no part of the present invention, but includes means for introducing the material to the interior of the conduit 22, and into the path of travel of air that is pressurized through the medium of the rotation of the blades 10, such as disclosed in my Patent No. 2,518,514, dated August 15, 1950.

A screen 24 for protecting the blades 10 against damage from accidental movement of the larger particles of material theretoward as the material is forced from the open end of the conduit 22, circumscribes the conduit 22 and covers the entire open end of the housing 20 in communication with a hollow cylinder 26. This screen 24 is held in place between the housing 20 and the proximal end of the cylinder 26, by bolts or analogous fastening means 28, all as illustrated in Fig. 1.

The cylinder 26 is frusto-conical throughout a portion of its length as at 30 and terminates in a reduced portion 32. Therefore, as the material is forced through the conduit 22 by the suction created therein when the blower 10 is rotated, and passes from the open end of the conduit 22, additional momentum is established within the pressurizing chamber formed by the portion 30, and a relatively high pressure zone for the material is created as it passes into the reduced portion 32 of the cylinder 26.

As the material passes from the open end of the cylinder 26, a hydrator mounted on the cylinder 26 directs fluid toward said material. This hydrator includes a collar 34 in telescoping relation with and extending beyond the cylinder 26, held in place by a set screw 36. External threads 38 on the collar 34 cooperate with internal threads formed in a ring 40 for permitting longitudinal movement of this ring 40 in adjusting the size of an outlet opening including a continuous, annular groove 42 formed in a head 44.

The head 44 is telescoped over the end of the collar 34 and is held in place by a number of cap screws 46 passing through the ring 40 along the periphery thereof.

The free end of the collar 34 extending beyond the cylinder 26 has its outer surface beveled as at 48 and 50 to cooperate with the groove 42 and a beveled portion 52 of the head 44 respectively to present an outlet opening for the fluid. This beveled portion 52 extends from the groove 42 and converges inwardly to the outermost face of the head 44. A pipe 54 in communication with a source of fluid under pressure (not shown) is threaded in an opening 56 extending radially into the head 44 and communicating with the groove 42.

From the foregoing it is clear that as the fluid passes into the groove 42 it is then directed in a path of travel that is at an angle inwardly toward the material passing from the collar 34 and outwardly beyond the open end of the head 44. This fluid is directed in complete encircling relation with the material and effective hydration thereof takes place as it moves to a point of use. The outlet opening formed by the groove 42 and the above-described, inclined walls of collar 34 and the head 44 may be varied in size to control the amount of fluid passing therethrough by removing the screws 46 and adjusting the ring 40, whereupon the tightening of the screws 46 will hold head 44 at the desired position.

A flexible gasket 58 inserted between the ring 40 and the head 44 serves not only as a lock washer to prevent loosening of the screws 46 due to vibration but permits minute adjustment of the fluid outlet opening to any desired size.

It is contemplated that the foregoing structure be used for blasting cement against a form or mold for building blocks held in position in the path of travel of the concrete by an endless belt or similar means. It is important therefore that the sand and cement plus any other desired ingredient for the blocks be properly mixed with a very exacting amount of water in order to insure that the final mixture has sufficient adhering qualities to stick to the upright surface of the mold. The hydrator as above described, in combination with the means for directing the dry material through the flow of water, makes such operation possible. Furthermore, it is notable that the material is moved entirely beyond any part of the structure before the liquid is brought into contact therewith. No gumming or clogging of parts of the feeder or hydrator takes place and continued operation over long periods of time is possible without attention.

It is realized that material feeders and hydrators may be made by altering details of construction without departing from the spirit of this invention or scope of the appended claims.

Having thus described the invention, what is claimed as new and desired to be secured by Letters Patent is:

1. A material feeder of the character described comprising an open-end conduit; means for forcing comminuted material through the conduit; a head on the conduit having connection with a source of liquid under pressure, said head being provided with an annular outlet port circumscribing a stream of comminuted material and disposed to direct liquid into said stream after it leaves the open end of said conduit; and a power driven centrifugal blower within the conduit having a series of radial blades arranged around the stream of material to direct a conical blast of air substantially radially inwardly toward the said material at a point adjacent to the said head, within the conduit, said conduit having a frusto-conical section therein between the said blower and the said head whereby to reduce the cross sectional area of the stream of material as the blast of air is forced thereagainst, said conduit including a section disposed in coaxial relationship with the said frusto-conical section at one end thereof opposite to said head for directing the material to said last mentioned section.

2. In a material feeder of the kind described, a hollow body having an outlet opening and an inlet opening arranged in opposed relationship; an elongated tubular member extending into said inlet opening for directing material to be fed into said body; and a centrifugal blower adjacent said inlet opening having a plurality of blades circumscribing said member for rotation thereabout, said blades being formed to direct a stream of air toward said outlet opening for forcing the material through the tubular member, the body and the outlet opening.

3. In a material feeder of the kind described, a hollow body having an outlet opening and an inlet opening arranged in opposed relationship; an elongated tubular member extending into said inlet opening for directing material to be fed into said body; a centrifugal blower adjacent said inlet opening having a plurality of blades circumscribing said member for rotation thereabout, said blades being formed to direct a stream of air toward said outlet opening for forcing the material through the tubular member, the body and the outlet opening; and an electric motor having a stator and a rotor circumscribing the tubular member, said rotor being rotatable about the tubular member and operably connected to said blower.

4. In a material feeder of the kind described, a hollow body having an outlet opening and an inlet opening arranged in opposed relationship; an elongated tubular member extending into said inlet opening for directing material to be fed into said body; a centrifugal blower adjacent said inlet opening having a plurality of blades circumscribing said member for rotation thereabout, said blades being formed to direct a stream of air toward said outlet opening for forcing the material through the tubular member, the body and the outlet opening; and an electric motor having a stator and a rotor circumscribing the tubular member, said rotor being rotatable about the tubular member and operably connected to said blower, said stator being disposed in closing relationship to a portion of said inlet opening and having a blower-receiving cavity formed therein communicating with the body.

5. In a material feeder of the kind described, a hollow body having an outlet opening and an inlet opening arranged in opposed relationship; an elongated tubular member extending into said inlet opening and having an open innermost end for directing material to be fed into said body;

and a centrifugal blower adjacent said end of the inlet opening and having a plurality of blades circumscribing said member for rotation thereabout, said blades being formed to direct a stream of air into the body toward said outlet opening for forcing the material through the tubular member, the body and the outlet opening.

WILLIAM E. ANDERSON.

REFERENCES CITED

The following references are of record in the file of this patent:

UNITED STATES PATENTS

| Number | Name | Date |
|---|---|---|
| 1,733,413 | Kay | Oct. 29, 1929 |
| 1,847,261 | Pawling | Mar. 1, 1932 |
| 1,982,480 | Pfaff | Nov. 27, 1934 |
| 2,299,565 | Colburn | Oct. 20, 1942 |

FOREIGN PATENTS

| Number | Country | Date |
|---|---|---|
| 104,893 | Austria | Dec. 10, 1926 |
| 521,614 | Great Britain | May 27, 1940 |